United States Patent
Imoto et al.

(10) Patent No.: US 10,177,385 B2
(45) Date of Patent: Jan. 8, 2019

(54) POSITIVE ELECTRODE ACTIVE MATERIAL FOR NICKEL-HYDROGEN SECONDARY BATTERY, NICKEL-HYDROGEN SECONDARY BATTERY INCLUDING THE POSITIVE ELECTRODE ACTIVE MATERIAL, AND METHOD OF EVALUATING POSITIVE ELECTRODE ACTIVE MATERIAL

(71) Applicants: FDK CORPORATION, Tokyo (JP); FUJITSU LIMITED, Kanagawa (JP)

(72) Inventors: Yuzo Imoto, Tokyo (JP); Takeshi Ito, Tokyo (JP); Shigekazu Yasuoka, Tokyo (JP); Shuuichi Doi, Isehara (JP); Takashi Yamazaki, Kawasaki (JP); Yuji Kataoka, Yokohama (JP)

(73) Assignees: FDK CORPORATION, Tokyo (JP); FUJITSU LIMITED, Kanagawa (JP)

( * ) Notice: Subject to any disclaimer, the term of this patent is extended or adjusted under 35 U.S.C. 154(b) by 104 days.

(21) Appl. No.: 15/349,933

(22) Filed: Nov. 11, 2016

(65) Prior Publication Data
US 2017/0141401 A1  May 18, 2017

(30) Foreign Application Priority Data
Nov. 16, 2015 (JP) .................................. 2015-224097

(51) Int. Cl.
*H01M 4/131* (2010.01)
*H01M 4/62* (2006.01)
(Continued)

(52) U.S. Cl.
CPC .............. *H01M 4/626* (2013.01); *H01M 4/32* (2013.01); *H01M 4/364* (2013.01); *H01M 4/366* (2013.01);
(Continued)

(58) Field of Classification Search
CPC ........ H01M 4/626; H01M 4/364; H01M 4/52; H01M 10/30; H01M 4/366; H01M 2004/028

See application file for complete search history.

(56) References Cited

U.S. PATENT DOCUMENTS

2002/0037455 A1*  3/2002  Tani ....................... H01M 4/30
429/223

FOREIGN PATENT DOCUMENTS

CN  101332509  * 12/2008 .............. H01M 4/52
JP  10154508 A  6/1998

OTHER PUBLICATIONS

Machine translation of CN 101332509, retrieved from <https://worldwide.espacenet.com/?locale=EN_ep> on Apr. 10, 2018.*

* cited by examiner

Primary Examiner — Cynthia K Walls
(74) Attorney, Agent, or Firm — Kinney & Lange, P.A.

(57) ABSTRACT

A nickel-hydrogen secondary battery includes an electrode group including a separator, a positive electrode and a negative electrode, the positive electrode includes a positive electrode active material, the positive electrode active material includes a composite particle including a compound of Co and a compound of Ni, and the ratio R represented by A/B satisfies a relationship of R≥0.3, when the amount of jumping in the X-ray absorption fine structure spectrum of the Co in 7600 to 7800 eV and the amount of jumping in the X-ray absorption fine structure spectrum of the Ni in 8300 to 8500 eV obtained by measurement according to a conversion electron yield method are defined as A and B, respectively.

9 Claims, 2 Drawing Sheets

(51) Int. Cl.
  *H01M 4/36* (2006.01)
  *H01M 4/52* (2010.01)
  *H01M 10/30* (2006.01)
  *H01M 4/32* (2006.01)
  H01M 4/02 (2006.01)
  H01M 10/34 (2006.01)
(52) U.S. Cl.
  CPC ............. *H01M 4/52* (2013.01); *H01M 10/30* (2013.01); *H01M 10/345* (2013.01); *H01M 2004/028* (2013.01)

POSITIVE ELECTRODE ACTIVE MATERIAL FOR NICKEL-HYDROGEN SECONDARY BATTERY, NICKEL-HYDROGEN SECONDARY BATTERY INCLUDING THE POSITIVE ELECTRODE ACTIVE MATERIAL, AND METHOD OF EVALUATING POSITIVE ELECTRODE ACTIVE MATERIAL

BACKGROUND OF THE INVENTION

Field of the Invention

The present invention relates to a positive electrode active material for a nickel-hydrogen secondary battery, a nickel-hydrogen secondary battery including the positive electrode active material, and a method of evaluating a positive electrode active material.

Description of the Related Art

A nickel-hydrogen secondary battery has been increasingly used in various applications such as various electronic equipment, electrical equipment and hybrid electric vehicles because of its higher capacity than a nickel-cadmium secondary battery and its excellent environment safety.

For example, a non-sintered positive electrode is known as the positive electrode for use in the nickel-hydrogen secondary battery. The non-sintered positive electrode is produced as follows, for example.

First, a nickel hydroxide particle as a positive electrode active material, a binder and water are kneaded to prepare a positive electrode mixture slurry, and the positive electrode mixture slurry is packed in a positive electrode substrate including a foamed nickel sheet having a porous structure. Next, the resultant is subjected to a slurry-drying process, and a rolling process for densifying the positive electrode mixture, to thereby form an intermediate product of a positive electrode. Thereafter, the intermediate product is cut to a predetermined dimension to thereby produce a non-sintered positive electrode. The non-sintered positive electrode has the advantage of enabling the positive electrode active material to be packed at a higher density than a sintering type positive electrode.

Meanwhile, nickel hydroxide when used alone has a low conductivity, and therefore has difficulty in increasing the rate of utilization of the positive electrode active material in the non-sintered positive electrode. Therefore, a nickel hydroxide particle is usually subjected to a treatment for increasing conductivity, and such a nickel hydroxide particle having an increased conductivity is thus used. There is known, as the nickel hydroxide particle having an increased conductivity, for example, a nickel hydroxide particle disclosed in Japanese Patent Laid-Open No. 10-154508. Specifically, cobalt hydroxide is precipitated on the surface of the nickel hydroxide particle, and thereafter heat-treated to thereby convert cobalt hydroxide on the surface of the nickel hydroxide particle to cobalt oxyhydroxide. Cobalt oxyhydroxide is excellent in conductivity, and therefore cobalt oxyhydroxide on the surface of each nickel hydroxide particle is mutually brought into contact to thereby form a conductive network. Thus, the conductivity of the positive electrode is increased, and the rate of utilization of the positive electrode active material is increased.

Meanwhile, if a battery is left to stand for a long period with being connected to a circuit, the battery is in a so-called deep discharge state where the battery is discharged to a voltage below the defined cutoff voltage.

If a battery with the above positive electrode having an increased conductivity is in a deep discharge state, the potential of the positive electrode becomes lower than or equal to the reduction potential of cobalt oxyhydroxide, and therefore the cobalt oxyhydroxide forming a conductive network on the surface of the positive electrode active material is reduced. If the cobalt oxyhydroxide is then reduced, the layer of the cobalt oxyhydroxide on the surface of the nickel hydroxide particle partially disappears to break the conductive network. As a result, the battery is deteriorated in charge receiving performance, not to achieve the same capacity as the initial capacity even if being charged again. In other words, the capacity recovery rate of the battery is decreased.

If the battery is repeatedly in the above deep discharge state many times, breaking of the conductive network progresses to result in a further decrease in capacity recovery rate of the battery. Such a battery having a decreased capacity recovery rate does not achieve a required capacity even if being charged again, and has difficulty in normally driving electrical equipment and the like.

Therefore, there is a demand for developing a battery that is resistant to deep discharge and that can allow a decrease in capacity recovery rate to be suppressed.

SUMMARY OF THE INVENTION

A positive electrode active material for a nickel-hydrogen secondary battery is provided, including a composite particle including a compound of Co and a compound of Ni, in which the ratio R represented by A/B satisfies a relationship of R≥0.3, when the amount of jumping in the X-ray absorption fine structure (XAFS) spectrum of the Co in 7600 to 7800 eV and the amount of jumping in the X-ray absorption fine structure (XAFS) spectrum of the Ni in 8300 to 8500 eV obtained by measurement according to a conversion electron yield method are defined as A and B, respectively.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, a nickel-hydrogen secondary battery (hereinafter, simply referred to as "battery".) 2 according to the present invention is described with reference to the drawings.

Figure 1:
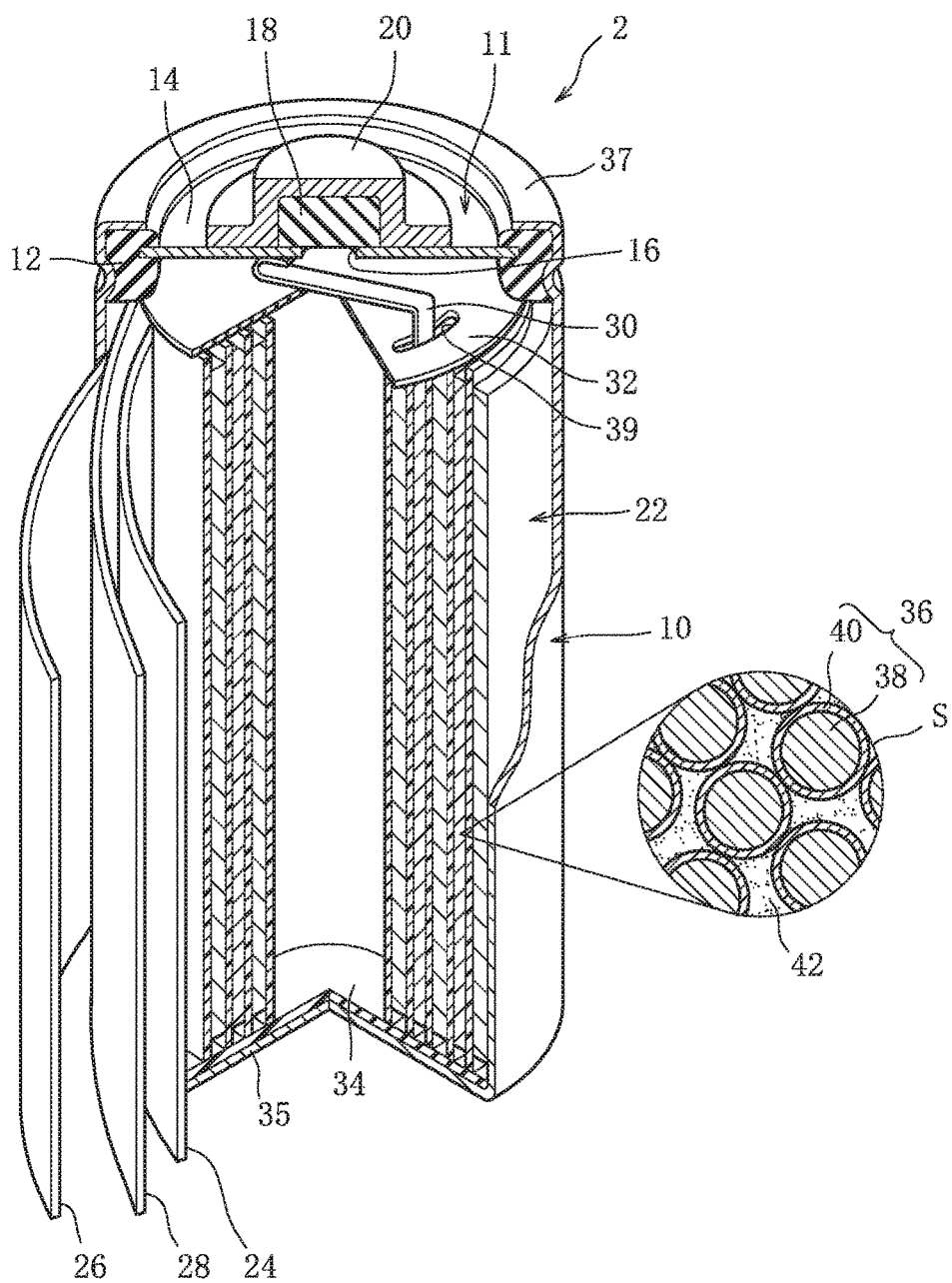
FIG. 1 is a perspective view illustrating a nickel-hydrogen secondary battery, partially fractured, according to one embodiment of the present invention.

A battery 2 to which the present invention is applied is descried with, as an example, a case where the present invention is applied to an AA-sized cylindrical battery 2 illustrated in FIG. 1, but not particularly limited thereto.

As illustrated in FIG. 1, the battery 2 includes a cylinder-shaped outer can 10 having an opening at the upper end thereof and having a bottom. The outer can 10 has conductivity, and a bottom wall 35 thereof serves as a negative electrode terminal. A sealing body 11 is secured to the opening of the outer can 10. The sealing body 11 includes a lid plate 14 and a positive electrode terminal 20, and seals the outer can 10 and also provides the positive electrode terminal 20. The lid plate 14 is a disc-shaped member having conductivity. The lid plate 14 and a ring-shaped insulating packing 12 surrounding the lid plate 14 are disposed in the opening of the outer can 10, and the insulating packing 12 is secured to an opening edge 37 of the outer can 10 by swaging of the opening edge 37 of the outer can 10. That is, the lid plate 14 and the insulating packing 12 work cooperatively to airtightly close the opening of the outer can 10.

The lid plate 14 here has a central through hole 16 at the center thereof, and a rubber valve 18 for clogging the central through hole 16 is disposed on the outer surface of the lid plate 14. Furthermore, a cylinder-shaped metallic positive electrode terminal 20 with a flange is electrically connected onto the outer surface of the lid plate 14 so as to allow the valve 18 to be covered therewith. The positive electrode terminal 20 pushes the valve 18 towards the lid plate 14. Here, a venting hole not illustrated is opened in the positive electrode terminal 20.

The central through hole 16 is normally closed airtightly by the valve 18. On the other hand, when a gas is generated in the outer can 10 to increase the internal pressure therein, the valve 18 is compressed by the internal pressure to open the central through hole 16, consequently allowing the gas to be released outwards via the central through hole 16 and the venting hole (not illustrated) of the positive electrode terminal 20 from the inside of the outer can 10. In other words, the central through hole 16, the valve 18 and the positive electrode terminal 20 form a safety valve for the battery.

An electrode group 22 is accommodated in the outer can 10. The electrode group 22 includes a positive electrode 24, a negative electrode 26 and a separator 28, each having a band shape, and the positive electrode 24, the negative electrode 26 and the separator 28 are spirally wound with the separator 28 being interposed between the positive electrode 24 and the negative electrode 26. That is, the positive electrode 24 and the negative electrode 26 are mutually stacked with the separator 28 being interposed therebetween. The outermost periphery of the electrode group 22 is formed from a part (outermost peripheral part) of the negative electrode 26, and is in contact with the inner peripheral wall of the outer can 10. That is, the negative electrode 26 and the outer can 10 are electrically connected to each other.

A positive electrode lead 30 is disposed between one end of the electrode group 22 and the lid plate 14 in the outer can 10. Specifically, one end of the positive electrode lead 30 is connected to the positive electrode 24, and the other end thereof is connected to the lid plate 14. Accordingly, the positive electrode terminal 20 and the positive electrode 24 are electrically connected to each other via the positive electrode lead 30 and the lid plate 14. Here, a circular upper insulating member 32 is disposed between the lid plate 14 and the electrode group 22, and the positive electrode lead 30 passes and extends through a slit 39 provided in the upper insulating member 32. In addition, a circular lower insulating member 34 is also disposed between the electrode group 22 and the bottom of the outer can 10.

Furthermore, a predetermined amount of an alkaline electrolytic solution (not illustrated) is injected into the outer can 10. The alkaline electrolytic solution, with which the electrode group 22 is impregnated, thus allows a chemical reaction (charge-discharge reaction) during charge-discharge between the positive electrode 24 and the negative electrode 26 to progress. As the alkaline electrolytic solution, an alkaline electrolytic solution including at least one of KOH, NaOH and LiOH as a solute is preferably used.

As the material of the separator 28, for example, a non-woven fabric made of fibers of polyamide or a non-woven fabric made of fibers of polyolefin such as polyethylene or polypropylene, to which a hydrophilic functional group is added, can be used.

The positive electrode 24 includes a conductive positive electrode substrate having a porous structure, and a positive electrode mixture retained in the pores of the positive electrode substrate.

As such a positive electrode substrate, for example, a foamed nickel (nickel foam) sheet can be used.

The positive electrode mixture includes a positive electrode active material particle 36 and a binder 42, as schematically illustrated in circle S in FIG. 1. The binder 42 serves to mutually bind the positive electrode active material particle 36 and also bind the positive electrode active material particle to the positive electrode substrate. As the binder 42, for example, carboxymethylcellulose, methylcellulose, a PTFE (polytetrafluoroethylene) dispersion, or a HPC (hydroxypropylcellulose) dispersion can be used.

The positive electrode active material particle 36 includes a composite particle including a compound of Co and a compound of Ni. A preferable mode thereof includes a mode having a base particle 38 including a compound of Ni and a conductive layer 40 including a compound of Co, covering the surface of the base particle 38.

As the base particle 38, a nickel hydroxide particle or a high-order nickel hydroxide particle is preferably adopted.

The average particle size of the base particle 38 is preferably set within the range from 8 µm to 20 µm. That is, in a non-sintered positive electrode, the surface area of a positive electrode active material can be increased to thereby increase the electrode reaction area of a positive electrode, resulting in an increase in the power of a battery. Therefore, the base particle 38 serving as the base of the positive electrode active material is also preferably a small size particle having an average particle size of 20 µm or less. When the thickness of the conductive layer 40 to be precipitated on the surface of the base particle is set at a certain value, however, the base particle 38 may have a smaller size to cause the proportion of the portion of the conductive layer 40 in the whole to be higher, thereby resulting in a relative decrease in the amount of the compound of Ni to decrease the unit capacity. The particle size of the base particle 38 is preferably 8 µm or more in consideration of the production yield. A more preferable range is from 10 µm to 16 µm.

In the above nickel hydroxide, at least one of cobalt and zinc is preferably in the form of a solid solution. Here, cobalt contributes to an enhancement in conductivity between the positive electrode active material particles, and zinc suppresses swelling of the positive electrode due to progressing of a charge-discharge cycle and contributes to an enhancement in cycle life characteristic of the battery.

With respect to the content(s) of the above element(s) as the solid solution(s) in the nickel hydroxide particle, the content of cobalt is preferably 0.5 to 5% by mass and the content of zinc is preferably 3 to 5% by mass relative to the nickel hydroxide.

The base particle 38 can be produced as follows, for example.

First, an aqueous nickel sulfate solution is prepared. An aqueous sodium hydroxide solution is gradually added to and reacted with the aqueous nickel sulfate solution to thereby precipitate a base particle 38 including nickel hydroxide. When zinc and cobalt are here allowed to be solid solutions in a nickel hydroxide particle, nickel sulfate, zinc sulfate and cobalt sulfate are weighed so as to provide a predetermined composition, and a mixed aqueous solution thereof is prepared. An aqueous sodium hydroxide solution is gradually added to and reacted with the resulting mixed aqueous solution with stirring of the mixed aqueous solution, to thereby precipitate a base particle 38 mainly including nickel hydroxide and including zinc and cobalt as solid solutions.

The cobalt compound as the conductive layer 40 covering the surface of the base particle 38 preferably has a thickness of 0.1 μm. Here, in order to form a cobalt compound having a thickness of 0.1 μm, an amount of about 2% by mass to 5% by mass of metallic Co is required.

As the conductive layer 40, a layer of a high-order cobalt compound such as cobalt oxyhydroxide (CoOOH) is preferably adopted. The layer of the cobalt compound preferably contains an alkali metal. More preferably, sodium is adopted as the alkali metal. Hereinafter, the cobalt compound containing sodium is referred to as "sodium-containing cobalt compound". The sodium-containing cobalt compound is specifically a compound where sodium is incorporated into a cobalt oxyhydroxide (CoOOH) crystal. Thus, the cobalt compound preferably contains sodium because the thickness uniformity of the resulting conductive layer becomes higher.

The thickness uniformity of the conductive layer here refers to the degree of the difference in thickness between a thicker portion and a thinner portion of the conductive layer, and the uniformity is higher as the difference in thickness between a thicker portion and a thinner portion thereof is smaller and the uniformity is lower as the difference in thickness between a thicker portion and a thinner portion thereof is larger.

The conductive layer 40 is formed by the following procedure.

First, the base particle 38 is loaded to an aqueous ammonia solution, and an aqueous cobalt sulfate solution is added to the aqueous solution. Thus, the base particle 38 serves as a nucleus to precipitate cobalt hydroxide on the surface of the nucleus, forming a composite particle including a conductive layer 40 including cobalt hydroxide. The resulting composite particle is circulated by convection in air under a high-temperature environment, and subjected to a heat treatment at a predetermined heating temperature for a predetermined heating time with such a state being kept. The heat treatment here is preferably maintained at 80° C. to 100° C. for 30 minutes to 2 hours. The heat treatment converts cobalt hydroxide on the surface of the composite particle to a cobalt compound high in conductivity (cobalt oxyhydroxide or the like).

When sodium is contained in a conductive layer 40 as a preferable mode, an aqueous sodium hydroxide solution is sprayed to the composite particle circulated by convection in air under a high-temperature environment and heat-treated. The treatment converts cobalt hydroxide on the surface of the composite particle to a cobalt compound high in conductivity (cobalt oxyhydroxide or the like) and also allows for incorporation of sodium. Thus, a positive electrode active material particle 36 covered with a conductive layer 40 including a cobalt compound containing sodium is obtained.

The cobalt compound as the conductive layer 40 here more preferably contains lithium because the conductivity of the conductive layer 40 is increased. In order that the cobalt compound containing sodium further contains lithium, an aqueous sodium hydroxide solution and also an aqueous lithium hydroxide solution are sprayed to the composite particle circulated by convection in air under a high-temperature environment, and the resultant is subjected to a heat treatment. Thus, a positive electrode active material particle 36 covered with a conductive layer 40 including a cobalt compound containing sodium and lithium is obtained. Lithium can be incorporated into a cobalt oxyhydroxide (CoOOH) crystal to thereby allow such a cobalt compound to have an extremely high conductivity, resulting in formation of a good conductive network that can enhance the rate of utilization of an active material in a positive electrode.

The conductive layer 40 is formed as described above, and therefore attached onto the base particle 38 with having a substantially uniform thickness. If the difference in thickness between a thicker portion and a thinner portion of the conductive layer 40 is large, the conductive layer 40 is fractured or broken during deep discharge with a thinner portion of the conductive layer 40 as the base point, to cause the conductive network to be partially fractured. As a result, the capacity recovery rate of the resulting battery is decreased. Therefore, when the thickness is substantially uniform as in the conductive layer 40 in the present invention, fracturing or breaking of the conductive layer during deep discharge hardly occurs to allow a good conductive network to be maintained, resulting in suppression of a decrease in the capacity recovery rate of the battery.

In the positive electrode active material particle 36 including a composite particle including a compound of Co and a compound of Ni according to the present invention, the ratio R represented by A/B satisfies a relationship of R≥0.3, when the amount of jumping in the X-ray absorption fine structure (XAFS) spectrum of Co in 7600 to 7800 eV and the amount of jumping in the XAFS spectrum of Ni in 8300 to 8500 eV obtained by measurement according to a conversion electron yield method are defined as A and B, respectively.

The ratio R in the XAFS spectrum depends on the thickness uniformity of the Co compound layer on the surface of the positive electrode active material particle 36, and a large R value means that the base particle 38 is uniformly covered with the Co compound layer, namely, the difference in thickness between a thicker portion and a thinner portion of the layer is small.

When the R value is 0.3 or more, the uniformity of the Co compound layer is increased to thereby inhibit the conductive network from being broken even in a deep discharge state. As a result, the capacity recovery rate of the battery is inhibited from being decreased.

On the other hand, when the R value is less than 0.3, the uniformity of the Co compound layer is decreased to thereby cause the difference in thickness between a thicker portion and a thinner portion of the conductive layer to be larger. In other words, the thickness of a thinner portion of the conductive layer is decreased. Thus, the Co compound layer is reduced and/or disappears during deep discharge with a thinner portion thereof as the base point, to cause the conductive network to be broken. As a result, the capacity recovery rate of the battery is decreased.

The XAFS analysis is here described.

In general, each element has the property of strongly absorbing an X-ray having an energy corresponding to the binding energy of a core electron, and the XAFS analysis is an analysis to be performed by use of such a property. Specifically, the X-ray energy where the coefficient of X-ray absorption of a substance is considerably increased is referred to as the absorption edge. Each element has a different binding energy of a core electron, and is irradiated with an X-ray having a larger energy than the binding energy to thereby have an increased coefficient of X-ray absorption according to emission of a core electron. Therefore, the X-ray absorption spectrum of any element can be measured to observe the absorption edge, thereby identifying such an element. In addition, a fine structure (XAFS oscillation) reflecting the environment/structure around an element is observed in the X-ray absorption spectrum at a higher energy than that of the absorption edge, and therefore this XAFS oscillation can be analyzed to thereby find out the local structure around an element of interest. Furthermore, it is known that the position of the absorption edge is shifted by the change in electronic state of an element, and the valence of an element of interest can be found out by comparison of the absorption edge. In the XAFS analysis in the present invention, specifically, the amount of jumping in the XAFS spectrum, which means the amount of a rapid change in the X-ray absorption spectrum above and below the absorption edge, is determined to thereby analyze the covering state with a film of a compound including an element of interest.

The positive electrode 24 can be then produced as follows, for example.

First, a positive electrode mixture slurry including the positive electrode active material particle 36 obtained as described above, water and the binder 42 is prepared. The positive electrode mixture slurry is packed in, for example, a foamed nickel sheet, and then dried. After drying, a foamed nickel sheet in which a nickel hydroxide particle or the like is packed is rolled and then cut to produce a positive electrode 24.

In the positive electrode 24 thus obtained, as illustrated in circle S in FIG. 1, a positive electrode active material particle 36 including a base particle 38 whose surface is covered with a conductive layer 40 is mutually brought into contact, and the conductive layer 40 forms a conductive network.

At least one selected from the group consisting of a Y compound, a Nb compound, a W compound and a Co compound is preferably added as an additive to the positive electrode 24. The additive inhibits dissolution of cobalt from the conductive layer 40 and inhibits the conductive network from being broken, when deep discharge is repeated. Therefore, the additive contributes to an enhancement in durability against deep discharge repeated. Here, preferably, for example, yttrium oxide is used as the Y compound, for example, niobium oxide is used as the Nb compound, for example, tungsten oxide is used as the W compound, and, for example, cobalt hydroxide is used as the Co compound.

The additive is added into the positive electrode mixture, and the content thereof is preferably set within the range from 0.2 to 2.0 parts by mass based on 100 parts by mass of the positive electrode active material particle. The reason is because, if the content of the additive is less than 0.2 parts by mass, the effect of inhibiting dissolution of cobalt from the conductive layer is not achieved, and if the content is more than 2.0 parts by mass, the effect is saturated and the amount of the positive electrode active material is relatively decreased to result in deterioration in capacity.

Next, the negative electrode 26 is described.

The negative electrode 26 has a band-shaped conductive negative electrode core, and a negative electrode mixture is retained on the negative electrode core.

The negative electrode core includes a sheet-shaped metal material in which a through hole is distributed, and for example, a punching metal sheet can be used therefor. The negative electrode mixture not only is packed in the through hole of the negative electrode core, but also is retained on both surfaces of the negative electrode core in a layered manner.

The negative electrode mixture includes a hydrogen storage alloy particle that can occlude and release hydrogen, as a negative electrode active material, and a conductive agent and a binder. The binder serves to mutually bind the hydrogen storage alloy particle and the conductive agent, and at the same time bind the hydrogen storage alloy particle and the conductive agent to the negative electrode core. A hydrophilic or hydrophobic polymer or the like can be used as the binder, and carbon black or graphite can be used as the conductive agent.

The hydrogen storage alloy in the hydrogen storage alloy particle is not particularly limited, and a hydrogen storage alloy to be commonly used for a nickel-hydrogen secondary battery can be adopted therefor.

The negative electrode 26 can be produced as follows, for example.

First, a hydrogen storage alloy powder including a hydrogen storage alloy particle, and a conductive agent, a binder and water are kneaded to prepare a negative electrode mixture paste. The resulting negative electrode mixture paste is applied to a negative electrode core, and then dried. After drying, the negative electrode core to which the hydrogen storage alloy particle and the like are attached is rolled and cut to thereby produce a negative electrode 26.

The positive electrode 24 and the negative electrode 26 produced as above are spirally wound with the separator 28 being interposed therebetween, to thereby form an electrode group 22.

The electrode group 22 thus obtained is accommodated in an outer can 10. Subsequently, a predetermined amount of an alkaline electrolytic solution is injected to the outer can 10. Thereafter, the outer can 10 accommodating the electrode group 22 and the alkaline electrolytic solution is sealed with a lid plate 14 provided with a positive electrode terminal 20, to thereby provide a battery 2 according to the present invention. The resulting battery 2 is subjected to an initial activation treatment, and can be thus used.

The positive electrode active material for a nickel-hydrogen secondary battery of the present invention includes a composite particle including a compound of Co and a compound of Ni, in which the ratio R represented by A/B satisfies a relationship of R≥0.3, when the amount of jumping in the X-ray absorption fine structure (XAFS) spectrum of the Co in 7600 to 7800 eV and the amount of jumping of the Ni in the X-ray absorption fine structure (XAFS) spectrum in 8300 to 8500 eV obtained by measurement according to a conversion electron yield method are defined as A and B, respectively. This inhibits the conductive network in the positive electrode from being broken even in a deep discharge state. Thus, a nickel-hydrogen secondary battery including the positive electrode active material of the present invention is resistant to deep discharge and can allow a decrease in capacity recovery rate to be suppressed.

Thus, the present invention can provide a positive electrode active material for a nickel-hydrogen secondary battery that can allow a decrease in capacity recovery rate to be suppressed even in a deep discharge state, as well as a nickel-hydrogen secondary battery including the positive electrode active material.

In addition, when the ratio R of the amount of jumping A in the XAFS spectrum of Co to the amount of jumping B in the XAFS spectrum of Ni satisfies a relationship of R≥0.3, the positive electrode active material can be easily determined to provide a nickel-hydrogen secondary battery that is resistant to deep discharge and that can allow a decrease in capacity recovery rate to be suppressed. In other words, the present invention can provide a method of evaluating whether or not the positive electrode active material can provide a nickel-hydrogen secondary battery that is resistant to deep discharge and that can allow a decrease in capacity recovery rate to be suppressed.

EXAMPLES

1. Production of Battery

Example 1

(1) Production of Positive Electrode

Nickel sulfate, zinc sulfate and cobalt sulfate were weighed so that the proportions of zinc and cobalt relative to nickel were 4% by mass and 1% by mass, respectively, and these were added to a 1 N aqueous sodium hydroxide solution including an ammonium ion to prepare a mixed aqueous solution. While the resulting mixed aqueous solution was stirred, a 10 N aqueous sodium hydroxide solution was gradually added to and reacted with the mixed aqueous solution, and the pH in the reaction was here stabilized to 13 to 14 to produce a base particle 38 mainly including nickel hydroxide and including zinc and cobalt as solid solutions.

The resulting base particle 38 was washed with a 10-fold amount of pure water three times, and thereafter dehydrated and dried. Herein, the resulting base particle 38 was subjected to particle size measurement with a laser diffraction/scattering type particle size distribution measurement apparatus, and as a result, the volume average particle size (MV) of the base particle 38 was 11 μm.

Next, the resulting base particle 38 was loaded to an aqueous ammonia solution, and an aqueous cobalt sulfate solution was added thereto with the pH during the reaction being maintained at 9 to 10. Thus, the base particle 38 served as a nucleus and cobalt hydroxide was precipitated on the surface of the nucleus, to provide an intermediate product particle provided with a cobalt hydroxide layer having a thickness of about 0.1 μm.

Next, the intermediate product particle was circulated by convection in air including oxygen under an environment of 80° C., sprayed by a 12 N aqueous sodium hydroxide solution, and subjected to a heat treatment for 45 minutes. Thus, cobalt hydroxide on the surface of the intermediate product particle was converted to cobalt oxyhydroxide high in conductivity, and sodium was also incorporated into a cobalt oxyhydroxide layer, to form a conductive layer 40 including cobalt oxyhydroxide containing sodium. Thereafter, a particle provided with such a cobalt oxyhydroxide layer was taken by filtration, washed with water and thereafter dried at 60° C. Thus obtained was a positive electrode active material particle 36 having the conductive layer 40 including cobalt oxyhydroxide containing sodium on the surface of the base particle 38.

Next, 100 parts by mass of positive electrode active material powder including the nickel hydroxide particle produced as above was mixed with 0.5 parts by mass of yttrium oxide powder, 0.5 parts by mass of niobium oxide powder, 0.2 parts by mass of HPC (hydroxypropylcellulose), 0.2 parts by mass of a PTFE dispersion liquid and 50 parts by mass of ion-exchanged water to prepare a positive electrode mixture slurry, and the positive electrode mixture slurry was packed in sheet-shaped foamed nickel (nickel foam) as a positive electrode substrate. The foamed nickel in which the positive electrode mixture slurry was packed was dried, and thereafter the foamed nickel in which the positive electrode mixture was packed was rolled and thereafter cut so as to have a predetermined shape, to provide a positive electrode 24 for an AA size.

(2) Production of Negative Electrode

First, hydrogen storage alloy powder including $LaNi_5$ particles as an $AB_5$ type hydrogen storage alloy was prepared. Here, the $LaNi_5$ particles were subjected to particle size measurement with a laser diffraction/scattering type particle size distribution measurement apparatus, and as a result, the volume average particle size (MV) of the $LaNi_5$ particles was 60 μm.

Next, 0.4 parts by mass of sodium polyacrylate powder, 1.0 part by mass of carbon black powder and 30 parts by mass of water were added to 100 parts by mass of the hydrogen storage alloy powder and kneaded to prepare a negative electrode mixture paste.

The negative electrode mixture paste was applied on both surfaces of a punching metal sheet as a negative electrode core so that a uniformity and constant thickness was achieved. Here, the punching metal sheet had a thickness of 60 μm, and both surfaces thereof were subjected to nickel plating.

After the paste was dried, the punching metal sheet where the negative electrode mixture was retained was rolled. Thereafter, the sheet was cut so as to have a predetermined dimension, to produce a negative electrode 26 for an AA size.

(3) Assembly of Nickel-Hydrogen Secondary Battery

The resulting positive electrode 24 and negative electrode 26 were spirally wound with a separator 28 being interposed therebetween, to thereby produce an electrode group 22. The separator 28 used for production of the electrode group 22 included a non-woven fabric made of sulfonated fibers of polypropylene, and the thickness thereof was 0.1 mm (basis weight: 53 g/m$^2$).

On the other hand, an alkaline electrolytic solution including an aqueous solution including NaOH and LiOH was prepared. The alkaline electrolytic solution had a NaOH concentration of 7.99N and a LiOH concentration of 0.7N.

Next, the electrode group 22 was accommodated in a cylinder-shaped outer can 10 having a bottom, and a predetermined amount of the alkaline electrolytic solution prepared was injected. Thereafter, the opening of the outer can 10 was sealed by a sealing body 11, and an AA-sized nickel-hydrogen secondary battery 2 having a nominal capacity of 2000 mAh was assembled.

With respect to the nickel-hydrogen secondary battery, a battery for use in XAFS analysis described later and a battery for use in measurement of the capacity recovery rate after deep discharge, described later, were each produced for a required number.

(4) Initial Activation Treatment

The resulting battery 2 was left to stand under an environment of a temperature of 25° C. for 12 hours, and thereafter a charge-discharge operation was repeated three times. In particular, in the charge-discharge operation, the battery 2 was charged at a charging current of 0.1 C for 16 hours, thereafter discharged at a discharging current of 0.2 C until the battery voltage reached 1.0 V. Thereafter, charging was performed at a charging current of 0.1 C for 16 hours and discharging was then performed at a discharging current of 1.0 C for 50 minutes, and thereafter discharging was performed at a discharging current of 0.5 C until the battery voltage reached 1.0 V. The initial activation treatment was thus performed to make the battery 2 usable.

Example 2

A nickel-hydrogen secondary battery was produced in the same manner as in Example 1 except that the intermediate product particle was circulated by convection in air including oxygen under an environment of 80° C., sprayed by a 12 N aqueous sodium hydroxide and a 4 N aqueous lithium hydroxide solution, and subjected to a heat treatment for 45 minutes to thereby form a conductive layer 40 in which cobalt hydroxide on the surface of the intermediate product particle was converted to cobalt oxyhydroxide and also sodium and lithium were incorporated in a layer of the cobalt oxyhydroxide, and which included a cobalt compound containing sodium and lithium.

Comparative Example 1

A nickel-hydrogen secondary battery was produced in the same manner as in Example 1 except that the intermediate product particle was circulated by convection in air including oxygen under an environment of 80° C. with neither an aqueous sodium hydroxide solution nor an aqueous lithium hydroxide solution being sprayed, and subjected to a heat treatment for 45 minutes to thereby form a conductive layer 40 where cobalt hydroxide on the surface of the intermediate product particle was converted to cobalt oxyhydroxide. Here, the conductive layer 40 in Comparative Example 1 contained neither sodium nor lithium.

2. Evaluation of Positive Electrode Active Material and Nickel-Hydrogen Secondary Battery (1) XAFS Analysis First, each battery for XAFS analysis among the batteries subjected to an initial activation treatment in Examples 1 and 2 and Comparative Example 1 was disassembled, and each positive electrode was taken out. The positive electrode taken out was washed with water and dried. Thereafter, ultrasonic vibration was applied to the positive electrode by an ultrasonic vibration apparatus, and positive electrode active material mixture powder left out from the positive electrode substrate was collected. The collected powder was used as a sample for XAFS analysis.

Subsequently, the obtained sample was subjected to XAFS analysis according to a conversion electron yield method with X-ray generated from a large synchrotron radiation facility (for example, Super Photon ring-8: SPring-8). The detail procedure is as follows.

First, a moderate amount of the sample was applied to a carbon tape. The carbon tape with the sample was placed on a sample stage in a conversion electron yield detector.

Next, a He gas was allowed to flow into the conversion electron yield detector, and a high voltage of 1 kV was applied. The sample was then irradiated with an X-ray, and a He atom ionized by collision with an electron emitted from the sample was collected on an electrode to thereby measure the XAFS spectrum of the sample. Thus, the XAFS spectrum data of each sample in Examples 1 and 2 and Comparative Example 1 was obtained.

Figure 2:
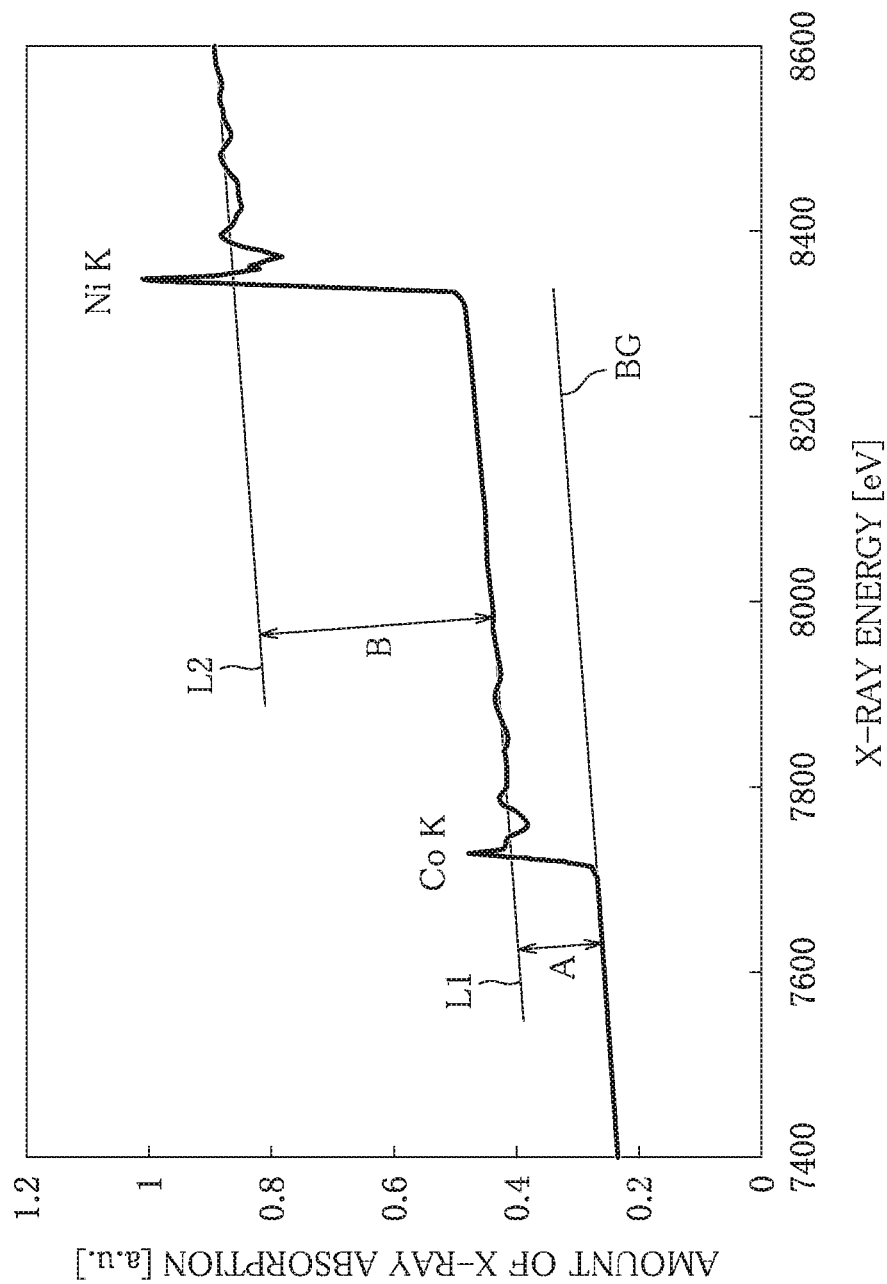
FIG. 2 is a graph illustrating the XAFS spectrum of a sample of a positive electrode active material according to Example 1.

The graph of the resulting XAFS spectrum of the sample in Example 1 is here illustrated in FIG. 2. In FIG. 2, a portion where the amount of X-ray absorption in 7600 to 7800 eV is rapidly changed corresponds to the K absorption edge of Co, and a portion where the amount of X-ray absorption in 8300 to 8500 eV is rapidly changed corresponds to the K absorption edge of Ni.

The graph in FIG. 2 includes other absorption except for the K absorption edges of Co and Ni, any absorption of other element constituting the sample, and XAFS oscillation reflecting the atomic structure around Co and Ni. Accordingly, the amounts of jumping at the K absorption edges of Co and Ni were determined by the following procedure.

First, the background straight line represented by reference symbol BG was determined by extrapolation with reference to the shape of the absorption spectrum at each absorption edge on a lower energy side.

Next, a straight line passing through the center of XAFS oscillation and being in parallel with the background straight line BG was drawn with reference to the shape of the absorption spectrum in an energy region where the XAFS oscillation decayed, in the absorption spectrum at each absorption edge on a higher energy side. Here, reference symbol L1 was affixed to the straight line with respect to Co, and reference symbol L2 was affixed to the straight line with respect to Ni. The amount A of jumping at the K absorption edge of Co was then calculated from the difference between the background straight line BG and the straight line L1, and the amount B of jumping at the K absorption edge of Ni was calculated from the difference between the straight line L1 and the straight line L2.

As described above, the amount of jumping (A) of Co, the amount of jumping (B) of Ni, the Co/Ni ratio (the ratio R in the XAFS spectrum) of the amount of jumping of Co to the amount of jumping of Ni in each of Examples 1 and 2, and Comparative Example 1 are shown in Table 1.

It is here indicated that, as the Co/Ni ratio (R) value is higher, the difference in thickness between a thicker portion and a thinner portion of the conductive layer including a compound of Co (hereinafter, referred to as "Co compound layer"), covering the surface of the nickel hydroxide particle, is smaller and the thickness uniformity of the Co compound layer is higher.

Here, the above method of evaluating the amount of jumping at each of the K absorption edges of Co and Ni is one example. In addition to the method, methods are known in which The Victoreen semi-empirical function or an n-order polynomial is utilized as the background curve, and a Cubic spline function or a moving average method is utilized as the absorption curve expressing such jumping, and any method among the methods provides the same results with respect to the amounts of jumping and the Co/Ni ratio of the amounts of jumping, as described in Non Patent Literature "X-ray absorption spectroscopy-XAFS and method thereof" (IPC).

(2) Measurement of Capacity Recovery Rate after Deep Discharge

A battery for use in measurement of the capacity recovery rate after deep discharge, for the battery subjected to the initial activation treatment in each of Examples 1 and 2, and Comparative Example 1, was prepared as each of a battery for deep discharge in a first condition and a battery for deep discharge in a second condition.

First, the initial capacity of each of such batteries was determined by performing so-called −ΔV control charging where charging was performed until the battery voltage reached the maximum value and was then decreased by 10 mV at 1.0 C under an environment of a temperature of 25° C., and thereafter performing discharging until the battery voltage reached 1.0 V at 0.2 C under the same environment.

Thereafter, each of the batteries was left to stand with being connected to a resistance of 2Ω, and was subjected to deep discharge. The battery to be subjected to deep discharge in a first condition was here left to stand under an environment of a temperature of 80° C. for 3 days and then subjected to deep discharge. On the other hand, the battery to be subjected to deep discharge in a second condition was left to stand under an environment of a temperature of 80° C. for 6 days and then subjected to deep discharge.

Each battery after deep discharge was repeatedly subjected to a charge-discharge cycle three times, where −ΔV control charging was performed at 1.0 C under an environment of a temperature of 25° C. and thereafter discharging was performed at 0.2 C under the same environment until the battery voltage reached 1.0 V. The capacity (capacity after deep discharge) here was then measured.

The capacity recovery rate after deep discharge was determined from the following expression (I), and the results were shown in Table 1.

Capacity recovery rate [%] after deep discharge=
(Capacity after deep discharge/Initial capacity)×
100   (I)

It is indicated that, as the value of the capacity recovery rate after deep discharge is larger, a higher resistance to deep discharge is achieved and the conductive network is more inhibited from being broken.

TABLE 1

|  | Amount of jumping of Co (A) | Amount of jumping of Ni (B) | Co/Ni ratio (R) | Capacity recovery rate after deep discharge [%] | |
| --- | --- | --- | --- | --- | --- |
|  |  |  |  | First condition | Second condition |
| Example 1 | 0.136 | 0.365 | 0.373 | 98.9 | 96.5 |
| Example 2 | 0.124 | 0.325 | 0.382 | 100.2 | 99.7 |
| Comparative Example 1 | 0.109 | 0.408 | 0.267 | 75.8 | 77.6 |

(3) Discussion

For the battery in Example 1, the capacity recovery rate after deep discharge in the first condition is 98.9% and the capacity recovery rate after deep discharge in the second condition is 96.5%. On the contrary, for the battery in Comparative Example 1, the capacity recovery rate after deep discharge in the first condition is 75.8% and the capacity recovery rate after deep discharge in the second condition is 77.6%. It can be thus confirmed that the battery in Example 1 is better in the capacity recovery rate after deep discharge than the battery in Comparative Example 1 and is further improved in resistance to deep discharge than the battery in Comparative Example 1.

The Co/Ni ratio (R) in the positive electrode in Example 1 is 0.373 and the thickness uniformity of the Co compound layer covering the surface of the nickel hydroxide particle is high, and it is therefore considered that the conductive network after deep discharge is kept good and the battery in Example 1 is thus excellent in the capacity recovery rate after deep discharge.

On the other hand, in Comparative Example 1, the Co/Ni ratio (R) in the positive electrode is 0.267, the difference in thickness between a thicker portion and a thinner portion of the Co compound layer covering the surface of the nickel hydroxide particle is large, and the thickness uniformity of the Co compound layer is low. Therefore, it is considered that a portion where the Co compound layer is thinner is reduced and degraded during deep discharge, to cause the conductive network to be partially broken, and therefore the battery in Comparative Example 1 is significantly decreased in the capacity recovery rate after deep discharge. Here, the capacity recovery rate of the battery in Comparative Example 1 is close to the capacity recovery rate of a battery with a positive electrode including a single nickel hydroxide particle, namely, a nickel hydroxide particle whose surface is covered with no Co compound layer.

The battery in Example 2 is higher in the capacity recovery rate after deep discharge than the battery in Example 1. In particular, even in the case of the second condition, namely, the case where the battery is left to stand in a deep discharge state for a longer period, the capacity recovery rate of the battery is good, and the battery in Example 2 is thus found to be more improved in resistance to deep discharge than the battery in Example 1.

In Example 2, the Co/Ni ratio (R) in the positive electrode is 0.382 and the thickness uniformity of the Co compound layer covering the surface of the nickel hydroxide particle is high, and it is thus considered that the conductive network after deep discharge is kept better and the battery in Example 2 is thus more excellent in the capacity recovery rate after deep discharge than the battery in Example 1.

It can be said from the foregoing that the ratio R in the XAFS spectrum of a positive electrode active material including a composite particle including a compound of Co and a compound of Ni can be 0.3 or more to thereby allow a battery strongly resistant to deep discharge to be provided.

The present invention is not intended to be limited to the above embodiments and Examples, and can be variously modified. For example, the nickel-hydrogen secondary battery may be a square battery, and the mechanical structure thereof is not particularly limited.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A positive electrode active material for a nickel-hydrogen secondary battery, comprising:
a composite particle comprising a compound of Co and a compound of Ni,
wherein a ratio R represented by A/B satisfies a relationship of R≥0.3, when an amount of jumping in an X-ray absorption fine structure (XAFS) spectrum of the Co in 7600 to 7800 eV and an amount of jumping in an X-ray absorption fine structure (XAFS) spectrum of the Ni in 8300 to 8500 eV obtained by measurement according to a conversion electron yield method are defined as A and B, respectively.

2. The positive electrode active material for a nickel-hydrogen secondary battery according to claim 1, wherein:
the composite particle comprises a base particle comprising nickel hydroxide as the compound of Ni, and a conductive layer covering a surface of the base particle and comprising the compound of Co, and
the conductive layer comprises an alkali metal.

3. The positive electrode active material for a nickel-hydrogen secondary battery according to claim 2, wherein the alkali metal is Na.

4. The positive electrode active material for a nickel-hydrogen secondary battery according to claim 2, wherein the alkali metal is Na and Li.

5. A nickel-hydrogen secondary battery comprising:
a container, and
an electrode group accommodated together with an alkaline electrolytic solution in the container, wherein:
the electrode group comprises a positive electrode and a negative electrode stacked with a separator being interposed therebetween, the positive electrode comprises a positive electrode active material, and the positive electrode active material comprises a composite particle comprising a compound of Co and a compound of Ni, wherein a ratio R represented by A/B satisfies a relationship of R≥0.3, when an amount of jumping in an X-ray absorption fine structure (XAFS) spectrum of the Co in 7600 to 7800 eV and an amount of jumping in an X-ray absorption fine structure (XAFS) spectrum of the Ni in 8300 to 8500 eV obtained by measurement according to a conversion electron yield method are defined as A and B, respectively.

6. The nickel-hydrogen secondary battery according to claim 5, wherein:

the composite particle comprises a base particle comprising nickel hydroxide as the compound of Ni, and a conductive layer covering a surface of the base particle and comprising the compound of Co, and the conductive layer comprises an alkali metal.

7. The nickel-hydrogen secondary battery according to claim 6, wherein the alkali metal is Na.

8. The nickel-hydrogen secondary battery according to claim 6, wherein the alkali metal is Na and Li.

9. A method of evaluating a positive electrode active material for a nickel-hydrogen secondary battery, comprising:

preparing a positive electrode active material powder comprising a composite particle comprising a compound of Co and a compound of Ni, irradiating the positive electrode active material powder with an X-ray, and sensing an amount of jumping A in an X-ray absorption fine structure (XAFS) spectrum of the Co in 7600 to 7800 eV and an amount of jumping B in an X-ray absorption fine structure (XAFS) spectrum of the Ni in 8300 to 8500 eV obtained by measurement according to a conversion electron yield method, and determining whether a relationship of R≥0.3 is satisfied, when a ratio of the amount of jumping A to the amount of jumping B, represented by A/B, is defined as R.

* * * * *